United States Patent
Tang et al.

(10) Patent No.: US 10,050,861 B2
(45) Date of Patent: Aug. 14, 2018

(54) ASSEMBLY FOR DEBUGGING MODEM AND METHOD THEREOF

(71) Applicant: AMBIT MICROSYSTEMS (SHANGHAI) LTD., Shanghai (CN)

(72) Inventors: Yue-De Tang, Shanghai (CN); Hau-Lung Huang, New Taipei (TW); Chu-Gao Zhu, Shanghai (CN)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 122 days.

(21) Appl. No.: 15/003,140

(22) Filed: Jan. 21, 2016

(65) Prior Publication Data

US 2017/0195070 A1 Jul. 6, 2017

(30) Foreign Application Priority Data

Dec. 30, 2015 (CN) .......................... 2015 1 1024368

(51) Int. Cl.
*H04B 3/46* (2015.01)
*H04L 12/26* (2006.01)

(52) U.S. Cl.
CPC .................................. *H04L 43/50* (2013.01)

(58) Field of Classification Search
CPC .......... G06F 3/038; G06F 3/14; G06F 1/1632; G06F 11/20; G06F 11/3656; G06F 15/16; G06F 15/163; H04W 40/24; H04L 29/06; H04L 45/00; H04L 2012/5615; H04L 65/1059; H04L 2012/5619; H04L 25/0272; H04L 41/00; H04L 1/24; H04L 1/20; H04L 12/26; H04L 12/70; H01R 24/64; H01R 2201/04; H04B 7/18584; H04B 17/23; H04B 3/56; H04B 17/24; H04Q 2213/13299; H04Q 2213/13389; H04Q 1/13; H01B 43/50
See application file for complete search history.

(56) References Cited

U.S. PATENT DOCUMENTS

| | | | | |
|---|---|---|---|---|
| 5,896,415 | A * | 4/1999 | Owens | G06F 11/2736 375/222 |
| 2006/0129895 | A1* | 6/2006 | Shin | G06F 11/3656 714/38.14 |
| 2012/0307438 | A1* | 12/2012 | Zhao | G06F 11/2733 361/679.4 |
| 2014/0049649 | A1* | 2/2014 | Chang | H04N 17/00 348/181 |

FOREIGN PATENT DOCUMENTS

| | | |
|---|---|---|
| CN | 102222056 A | 10/2011 |
| CN | 103138850 A | 6/2013 |
| TW | 201250485 A | 12/2012 |

* cited by examiner

*Primary Examiner* — Rahel Guarino
(74) *Attorney, Agent, or Firm* — ScienBiziP, P.C.

(57) ABSTRACT

A debugging assembly includes a modem including a control unit, a switch unit, and an RJ45 port. The control unit is coupled to the RJ45 port through the switch unit. The control unit is configured to detect a network connection status of the modem and transmit a control signal to selectively couple the switch unit to pins of the RJ45 port to selectively receive a network signal or a debugging signal.

11 Claims, 2 Drawing Sheets

ASSEMBLY FOR DEBUGGING MODEM AND METHOD THEREOF

FIELD

The subject matter herein generally relates to an assembly for debugging a modem and a method thereof.

BACKGROUND

Generally, when debugging a modem during an initial design phase of the modem, a specialized port of the modem is used for debugging. When the modem is mass produced, the specialized port is usually removed. If the modem requires to be debugged again, the specialized port needs to be reattached to the modem for debugging.

BRIEF DESCRIPTION OF THE DRAWINGS

Implementations of the present technology will now be described, by way of example only, with reference to the attached figures.

DETAILED DESCRIPTION

Figure 1:
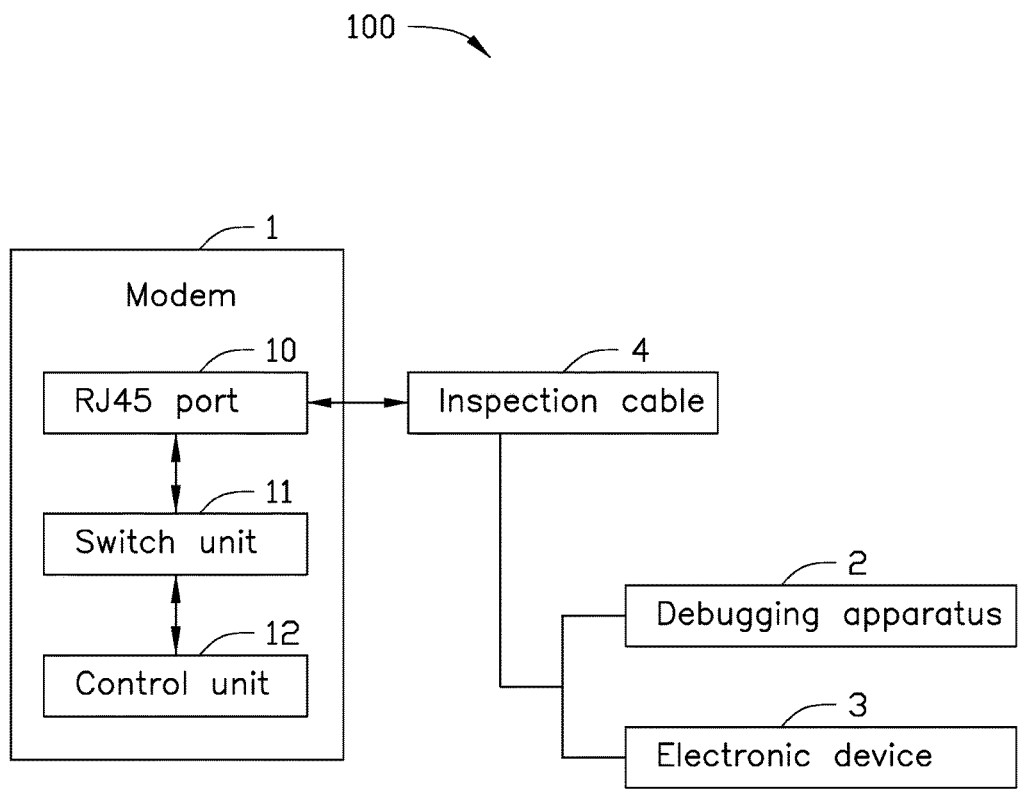
FIG. 1 is a block diagram of an embodiment of a debugging assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of a debugging assembly 100. The debugging assembly 100 can include a modem 1, a debugging apparatus 2, and an electronic device 3. In at least one embodiment, the modem 1 is coupled to the debugging apparatus 2 and the electronic device 3 through an inspection cable 4. The debugging apparatus 2 can transmit a debugging signal to the modem 1 to debug the modem 1. The electronic device 3 can include a display (not shown) to display a feedback result of debugging the modem 1. In at least one embodiment, the electronic device 3 can be a personal computer, a laptop computer, or the like. A first end of the inspection cable 4 can be coupled to the modem 1 through a corresponding coupling head. A second end of the inspection cable 4 can be coupled to the debugging apparatus 2 through a corresponding coupling head. A third end of the inspection cable 4 can be coupled to the electronic device 3 through a corresponding coupling head.

In at least one embodiment, the modem 1 can include an RJ45 port 10, a switch unit 11, and a control unit 12. The control unit 12 can be coupled to the RJ45 port 10 through the switch unit 11. The switch unit 11 is used for controlling the RJ45 port 10 to selectively receive a network signal or a debugging signal. In at least one embodiment, a first end of the switch unit 11 is coupled to a GPIO port of the modem 1 to receive a control signal from the control unit 12, and another end of the switch unit 11 is coupled to the RJ45 port 10. In at least one embodiment, the switch unit 11 can be an integrated circuit, such as an AS179-92LF chip.

The RJ45 port 10 can include eight pins. A first pin, a second pin, a third pin, and a sixth pin of the RJ45 port 10 can be a TX+ pin, a TX− pin, an RX+ pin, and an RX− pin, respectively. "TX" represents transmitting data, and "RX" represents receiving data. A fourth pin, a fifth pin, a seventh pin, and an eighth pin of the RJ45 port 10 are standby pins. In at least one embodiment, the fourth, fifth, seventh, and eighth pins are used for transmitting the debugging signal. Thus, a separate debugging port is not required to be attached to the modem 1 to debug the modem 1.

The control unit 12 can detect a current network connection status of the modem 1 to selectively couple the switch unit 11 to the RJ45 port 10, thereby selectively receiving the network signal or the debugging signal. The control unit 12, upon receiving the debugging signal, can debug the modem 1 and transmit the feedback result of debugging the modem 1 to the electronic device 3.

In at least one embodiment, the control signal transmitted by the control unit 12 can include a first control signal and a second control signal. When the control unit 12 detects that the network connection status is in a disconnection status or a first connection status, the control unit 12 transmits the first control signal at a high level and the second control signal at a low level to the switch unit 11 to control the switch unit 11 to couple to the first pin, the second pin, the third pin, and the sixth pin of the RJ45 port 10. When the network connection status is in the disconnection status or the first connection status, the control unit 12 receives a first network signal and a second network signal. When the control unit 12 detects that the network connection status is in a second connection status, the control unit 12 transmits the first control signal at a low level and the second control signal at a high level to the switch unit 11 to control the switch unit 11 to couple to the fourth pin, the fifth pin, the seventh pin, and the eighth pin of the RJ45 port 10. When the network connection status is in the second connection status, the control unit 12 receives the first network signal and the debugging signal.

In at least one embodiment, the first connection status is a low-speed connection status (100 megabytes/second or lower), and the second connection status is a high-speed connection status (1000 megabytes/second or higher). The first network signal is transmitted in the first network connection status, and the second network signal is transmitted in the second network connection status.

Figure 2:
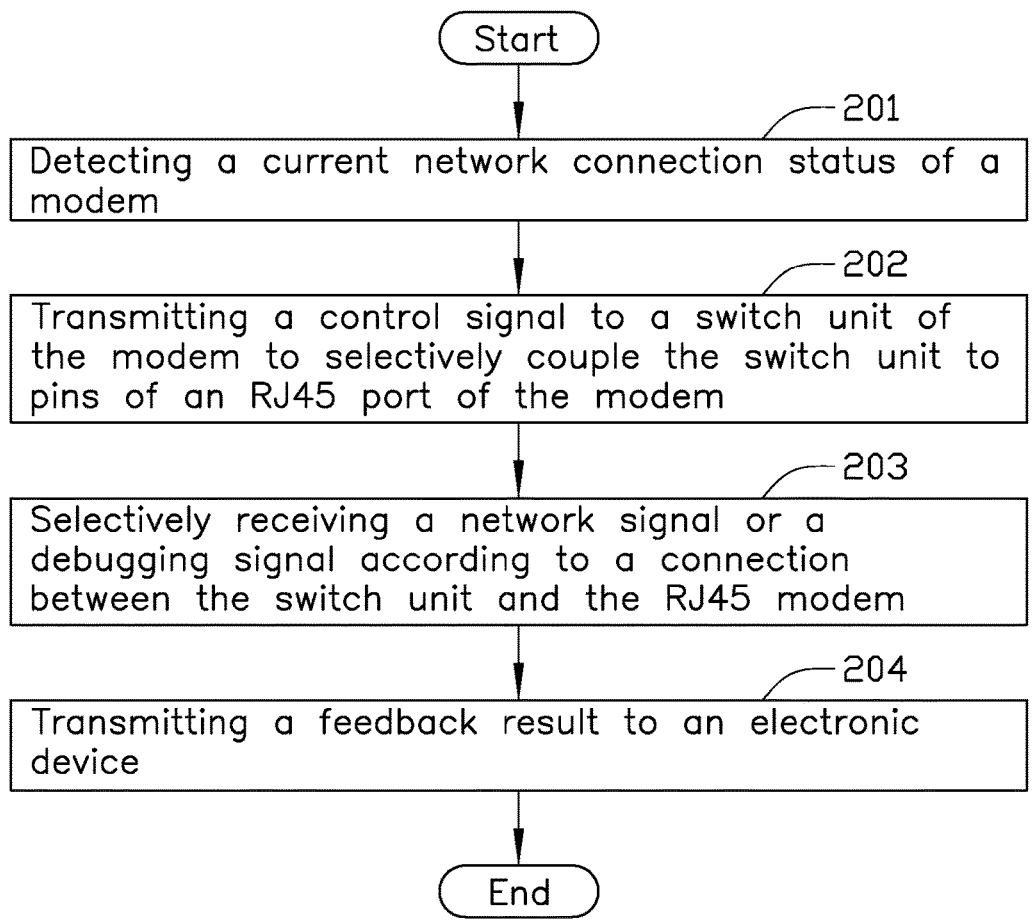
FIG. 2 is a flowchart of an embodiment of a method for debugging a modem.

FIG. 2 illustrates a flowchart of an exemplary method for debugging a modem. The example method is provided by way of example, as there are a variety of ways to carry out the method. The method described below can be carried out using the configurations illustrated in FIG. 1, for example, and various elements of the figure are referenced in explaining the example method. Each block shown in FIG. 1 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 201.

At block 201, when a control unit of the modem detects that an inspection cable has been inserted into an RJ45 port of the modem, the control unit detects a current network connection status of the modem. The network connection status can be a disconnection status, a first connection status, or a second connection status. In at least one embodiment, the first connection status is a low-speed connection status (100 megabytes/second or lower), and the second connection status is a high-speed connection status (1000 megabytes/second or higher).

At block 202, the control unit can transmit a control signal to a switch unit of the modem to selectively couple the switch unit to pins of the RJ45 port. The control signal can include a first control signal and a second control signal. When the control unit detects that the network connection status is in a disconnection status or a first connection status, the control unit transmits the first control signal at a high level and the second control signal at a low level to the switch unit to control the switch unit to couple to a first pin, a second pin, a third pin, and a sixth pin of the RJ45 port. When the control unit detects that the network connection status is in a second connection status, the control unit transmits the first control signal at a low level and the second control signal at a high level to the switch unit to control the switch unit to couple to a fourth pin, a fifth pin, a seventh pin, and an eighth pin of the RJ45 port.

At block 203, the control unit can selectively receive a network signal or a debugging signal. When the network connection status is in the disconnection status or the first connection status, the control unit receives a first network signal and a second network signal. When the network connection status is in the second connection status, the control unit receives the first network signal and the debugging signal. The first network signal is transmitted in the first network connection status, and the second network signal is transmitted in the second network connection status.

At block 204, the control unit transmits a feedback result to an electronic device coupled to the modem.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A modem debugging method, the modem having a control unit, a switch unit, and an RJ45 port, comprising:
   the control unit inspecting, when a debugging cable is inserted into the RJ45 port of the modem, a first network connection or second network connection or disconnection status of the modem;
   the control unit transmitting, a control signal to the switch unit to selectively couple the switch unit to corresponding pins of the RJ45 port; and
   the control unit selectively receiving, when the switch unit is selectively coupled to the RJ45 port, a network signal or a debugging signal;
   wherein the control signal comprises a first control signal and a second control signal;
   when a current network connection status is in the disconnection status or the first network connection status, the first control signal is transmitted to the switch unit at a high level and the second control signal is transmitted at a low level;
   when the current network connection status is in the second network connection status, the first control signal is transmitted to the switch unit at a low level and the second control signal is transmitted at a high level.

2. The method of claim 1, wherein:
   the switch unit couples to a first pin, a second pin, a third pin, and a sixth pin of the RJ45 port in accordance with the disconnection status or the first network connection status; and
   the switch unit to couple to a fourth pin, a fifth pin, a seventh pin, and an eighth pin of the RJ45 port in accordance with the second network connection status.

3. The method of claim 2, wherein:
   first network connection status is a low-speed connection status; and
   second network connection status is a high-speed connection status.

4. The method of claim 2, wherein:
   when the switch unit is coupled to the first pin, the second pin, the third pin, and the sixth pin of the RJ45 port, a first network signal and a second network signal are received; and
   when the switch unit is coupled to the fourth pin, the fifth pin, the seventh pin, and the eighth pin of the RJ45 port, the first network signal and the debugging signal are received.

5. The method of claim 4, wherein:
   the first network signal is a signal transmitted in the first network connection status;
   and the second network signal is a signal transmitted in the second network connection status.

6. The method of claim 1 comprising transmitting, after the modem has been debugged, a feedback result to an electronic device coupled to the modem.

7. A modem debugging assembly, for a modem comprising a control unit; a switch unit; and an RJ45 port, comprising:
   wherein the control unit is coupled to the RJ45 port through the switch unit; and
   wherein the control unit is configured to detect a first network connection status, a second network connection status, or a disconnection status of the modem and transmit a control signal to selectively couple the switch unit to pins of the RJ45 port to selectively receive a network signal or a debugging signal,
   wherein the control signal comprises a first control signal and a second control signal;
   when a current network connection status is in the disconnection status or the first network connection status, the first control signal is transmitted at a high level and the second control signal is transmitted at a low level;
   when the current network connection status is in the second network connection status, the first control signal is transmitted at a low level and the second control signal is transmitted at a high level to the switch unit.

8. The debugging assembly of claim 7, wherein:
the switch unit to control the switch unit to couple to a first pin, a second pin, a third pin, and a sixth pin of the RJ45 port in accordance with the disconnection status or the first network connection status; and
the switch unit to control the switch unit to couple to a fourth pin, a fifth pin, a seventh pin, and an eighth pin of the RJ45 port in accordance with the second network connection status.

9. The debugging assembly of claim 7, wherein:
the first network connection status is a low-speed connection status; and
the second network connection status is a high-speed connection status.

10. The debugging assembly of claim 7, wherein:
the modem is coupled to a debugging apparatus and an electronic device by an inspection cable; and
the electronic device is configured to display a feedback result of debugging the modem.

11. The debugging assembly of claim 10, wherein:
a first end of the inspection cable is coupled to the RJ45 port by a corresponding coupling head;
a second end of the inspection cable is coupled to the debugging apparatus through a corresponding coupling head; and
a third end of the inspection cable is coupled to the electronic device through a corresponding coupling head.

* * * * *